United States Patent [19]

Mattson et al.

[11] Patent Number: 4,490,325
[45] Date of Patent: Dec. 25, 1984

[54] PROCESS FOR MULTI-STAGE DEAD-END-WATER TIRE CURING

[75] Inventors: William F. Mattson, Hinckley; Dennis L. Trapp, Akron, both of Ohio

[73] Assignee: The B. F. Goodrich Company, Akron, Ohio

[21] Appl. No.: 528,190

[22] Filed: Aug. 31, 1983

[51] Int. Cl.³ .............................................. B29H 5/01
[52] U.S. Cl. ..................................... 264/315; 264/326; 264/347; 425/30
[58] Field of Search ...................... 264/315, 326, 40.6, 264/236, 347; 425/29, 30

[56] References Cited

U.S. PATENT DOCUMENTS

| | | | |
|---|---|---|---|
| 3,489,833 | 1/1970 | Lehnen | 264/315 |
| 3,579,626 | 5/1971 | Brittain | 264/315 |
| 4,126,657 | 11/1978 | Gado | 264/315 |
| 4,371,483 | 2/1983 | Mattson | 264/315 |

Primary Examiner—Jay H. Woo
Assistant Examiner—Tinker R. McBrayer
Attorney, Agent, or Firm—Vincent A. Greene; Harry F. Pepper, Jr.; Alfred D. Lobo

[57] ABSTRACT

A simple economical multistage vulcanization process is disclosed for producing premium anomaly-free tires wherein the inner liner or curing bladder is supplied with dead end water and steam sequentially in several stages at high pressures which assure thorough diffusion of entrapped air. The internal steam pressure is 250 to 300 psig in stage I to effect rapid heat transfer, the internal water pressure in stage II is from 300 to 450 psig, and the internal steam pressure is 250 psig or higher in the first part of stage III. The overall cycle time for curing radial passenger car tires in "Bag-O-Matic" presses is reduced one minute or more by using internal steam pressures from 250 to 300 psig in stage I and III and reducing the steam pressure near the end of stage III to boil off the residual water.

9 Claims, 2 Drawing Figures

PROCESS FOR MULTI-STAGE DEAD-END-WATER TIRE CURING

BACKGROUND OF THE INVENTION stages

The present invention relates to a simple, reliable, energy-efficient vulcanizing system for mass production of top quality anomaly-free rubber tires.

For decades it has been recognized that the performance of truck and passenger car tires is greatly improved when the tires are vulcanized with high internal curing pressures. However, as steam pressures are increased substantially above 200 psig, the high vulcanization temperatures create problems. It is difficult to provide adequate internal bladder pressure with high-temperature steam without degrading the rubber or forming an inferior tire. For many years pneumatic rubber tires have been vulcanized using internal steam pressures of around 200 psig, but this pressure is inadequate to assure proper diffusion of entrapped air in modern tires.

Many different processes have been employed to provide the desired high internal bladder pressure while limiting the vlucanizing temperature, as disclosed, for example, in U.S. Pat. Nos. 2,066,265; 3,489,833; 3,579,626 and 4,027,543; and in "*The Applied Science of Rubber*", W. J. S. Naunton (1961), pages 1053-1083. The latter publication describes various tire curing systems which have been used including those employing circulating hot water, dead-end hot water, and steam. Some use high-pressure steam in the bladder followed by lower pressure steam; some use high-pressure steam followed by high-pressure dead-end hot water; and others use high pressure steam followed by circulating high-pressure hot water.

The circulating hot-water curing systems with internal bladder pressures of 300 to 400 psig provide tires of highest quality, the so-called "anomaly-free" tires which are free from defects due to entrapped air and detectable by holographic testing equipment. Similar results can be obtained in steam-nitrogen systems using nitrogen at pressures of 300 to 450 psig (see U.S. Pat. No. 4,027,543). Both of these systems provide the temperature-pressure combination needed to provide top-quality truck and passenger car tires, but they require large capital investment and are costly to operate and maintain.

Dead-end water curing systems have been known for decades and can be used for vulcanization of tires and other rubber products in cures of limited duration. In this system heated water at a pressure of 300 psig or higher is supplied to the curing bladder within the mold and the outward flow is interrupted or cut off while the inlet pressure is maintained. When used for curing tires the system has a number of problems. Still water results in poor heat transfer because of the low film coefficient which is less than 2 percent of that for steam. Temperature stratification begins at the water-bladder interface in a short period of time. Because of the temperature gradient, the bladder temperature at one sidewall of the tire is different from that at the other side. Also the temperature of the water drops over a period of time as heat is transferred to the bladder. Curing of the tire is not uniform.

Circulating hot water systems do not suffer from these problems and have been considered more reliable. Water circulation increases the rate of heat transfer to the bladder and makes it possible to maintain a constant vulcanizing temperature. Because of the superiority of the circulating hot water curing system and the high standards demanded by the tire industry, this system was chosen by tire manufacturers and has been the mainstay of the tire industry for decades in spite of its inefficiency and high cost of operation and maintenance (see U.S. Pat. No. 3,579,626).

The rubber tire industry has long believed that vulcanization at high pressures, such as 300 to 400 psig, was necessary to manufacture anomaly-free tires and that there was no simple and reliable way to maintain tire quality without costly equipment.

Heretofore, heavy duty truck tires, for example, have been cured for 40 to 90 minutes or more using circulating water at a high pressure, such as 400 psig, and a constant temperature, such as 170° C. to 185° C. Water circulation was considered necessary in such cures to meet quality standards. Prior to this invention it was not known how those high standards could be met without great capital investment in new equipment or how they could be met with a simple change in procedure using dead-end water or steam to provide the internal bladder pressure during curing.

Tire manufacturers have long recognized the need to minimize the mold curing time in making tires and the fact that millions of dollars could be saved every year by merely reducing the time for curing each tire by one minute (min) or so. The fact is that a 0.5 min reduction in cure time is extremely important in the vulcanization of passenger car tires where the ordinary curing cycle may be 15 min or less. Major efforts have been made over the years to reduce the cure time by use of new rubber compositions and higher curing temperatures. However, prior to this invention, it was not known how to provide a cure with standard rubber tire compositions which maintained or improved tire quality while reducing cure time 5 to 10 percent.

SUMMARY OF THE INVENTION

The present invention involves a simple, reliable multistage process which does not require a substantial capital investment in new equipment and which enables tire manufacturers to realize enormous savings.

The invention involves an improvement in the method of heating and pressurizing the curing bladder of a tire mold wherein the bladder is supplied with steam and water sequentially in several distinct stages at high pressures which assure proper diffusion of entrapped air. In the first stage, steam at a high pressure, such as 250 to 300 psig, is supplied to the curing bladder for at least several minutes to effect rapid heat transfer through the bladder. In the second stage, heated water is supplied to the bladder at a high pressure, such as 300 to 450 psig, and maintained in the bladder for a portion of the curing cycle while outward flow from the bladder is cut off or "dead ended." The third stage begins with expulsion of water from the bladder by high pressure stream at a pressure such as 250 to 300 psig, and continues with heating steam supplied to the bladder for 25 to 60 percent of the pressure-curing period. The "pressure-curing period" as defined herein begins with the introduction of high-pressure steam in the first stage and ends with the release of pressure at the end of the third stage. The term "high pressure steam" refers to a pressure in the range from about 200 to 350 psig.

Before the end of the third stage the steam pressure is lowered to cool the inner surface of the bladder and to boil off residual water. The steam pressure and temperature can easily be regulated to improve the cure or to assure adequate curing in the regions of least cure at the tread shoulders. At the end of the pressure-curing period, the pressure in the bladder is released to start the blowdown. Surprisingly, the process of this invention causes a material reduction in the time required to lower the steam pressure and to open the mold. The time required for the blowdown can be cut in half.

The overall cycle time can be further reduced by use of internal steam temperature in excess of 200° C. during the third stage and by providing a hot curing bladder at the end of each cycle so that the tire carcass is heated immediately by the preheated bladder at the beginning of the next cycle. The average temperature of the preheated bladder at the start of stage I is preferably from about 175° C. to 210° C. Bladder life is enhanced by reducing the pressure and cooling the interior surface portions of the bladder near the end of the pressure-curing period.

The above process is well suited for curing of tires in standard shaping and vulcanizing presses, such as "Bag-O-Matic" and "Autoform" presses. For example, where the pressure-curing period is 20 min or less, steam may be supplied to the preheated bladder in stage I for 3 to 8 min at a pressure from 250 to 300 psig or higher., dead end water may be provided in stage II at a pressure of from 300 to 450 psig for 3 to 12 min, steam at a pressure of about 250 to 300 psig may be provided in stage III to increase the bladder temperature and to assist in diffusion of entrapped air, and the steam pressure may be reduced to within the range of 100 to 190 psig near the end of the pressure-curing period to cool the interior surface portions of the hot bladder and to boil off residual water.

The process of this invention makes it possible to obtain remarkable reductions in the overall cycle time, such as one min or more, even when the pressure-curing period is 12 to 20 min, and this can be achieved without sacrifice of quality. In truck tires, such reductions may be 2 min or more. The shorter curing cycles, the use of steam for a major part of the cycle, and the elimination of the expensive circulating water system results in a material reduction in the cost of tire manufacture. The process is reliable and assures production of premium anomaly-free tires with thorough diffusion of entrapped air.

An object of the invention is to provide a simple, reliable, energy-efficient process for vulcanizing tires which minimizes the cost of manufacture and permits maintenance of stringent quality standards.

BRIEF DESCRIPTION OF THE DRAWINGS

The foregoing and other objects and advantages of the invention will appear more fully from the following description, made in connection with the accompanying drawings in which.

DETAILED DESCRIPTION OF PREFERRED EMBODIMENTS

The invention relates to vulcanization of belts, tires and other rubber articles and particularly to the curing of rubber tires in tire molds containing a conventional curing bladder as described for example, on pages 1053–1083 of "*The Applied Science of Rubber*", W. J. S. Naunton (1961).

Figure 1:
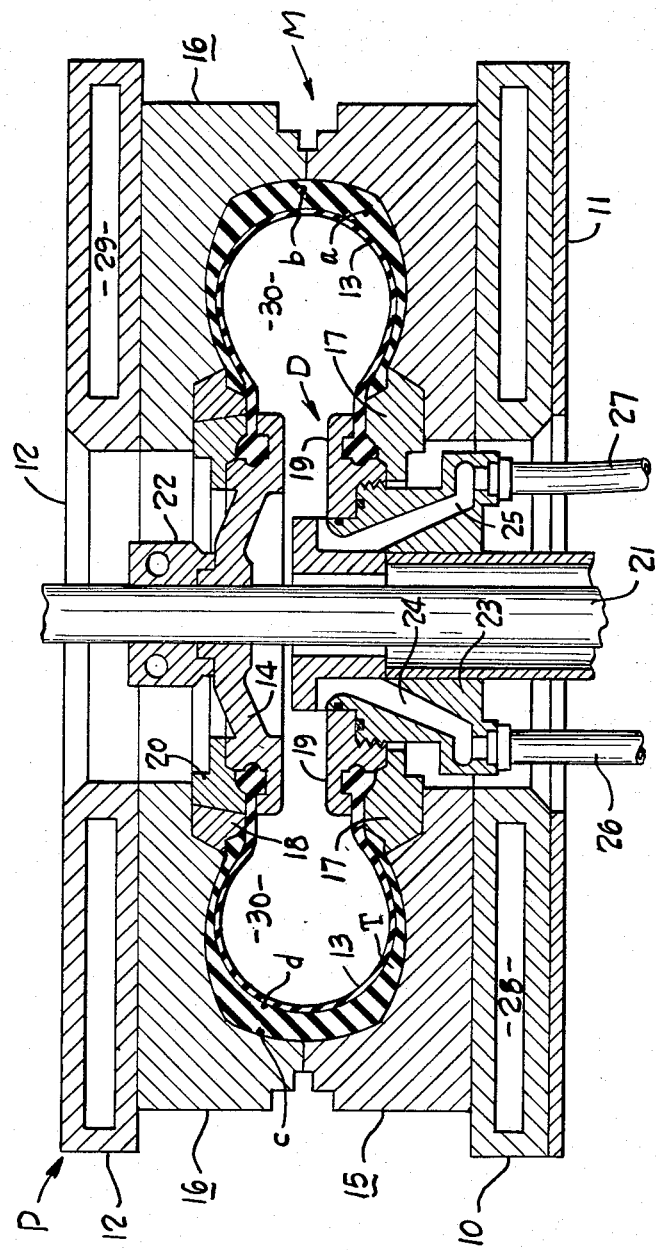
FIG. 1 is a partial vertical cross-sectional view on a reduced scale, showing the conventional type of equipment which maybe used in the practice of the invention including a shaping and vulcanizing press and a fire mold.

Referring to the drawings, FIG. 1 shows a platen press P and a tire mold M during curing of a standard tire T. The drawing is schematic with parts omitted, and the mold and the press are not drawn to scale. The platen press P may be a standard type of "Bag-O-Matic" press substantially as shown and described, for example, in U.S. Pat. No. 2,808,618 or other patents of L. E. Soderquist.

As shown herein, the press P includes a fixed platen 10, a bed 11 and a platen 12 rigidly mounted on the movable upper portion of the press (not shown). As indicated in the last-named patent, conventional means are provided for raising, lowering and tilting the entire upper assembly. A conventional diaphragm assembly D is provided at the center of the press having a curing bladder or diaphragm 13 attached to a movable diaphragm plate 14 as indicated in the aforesaid patent and in U.S. Pat. No. 2,775,789.

The lower and upper halves 15 and 16 of the tire mold M are rigidly connected to the platens 10 and 12. A multiplicity of vent passages (not shown) extend from the toroidal mold cavity to the exterior of the mold. The mold has lower and upper bead positioning rings 17 and 18 and a lower diaphragm clamping ring 19. An upper diaphragm clamping ring 20 fits within the ring 18. The plate 14 is moved vertically by a piston rod 21 having an attaching collar 22. An annular support member 23 has a pair of passages 24 and 25 in communication with inlet and outlet conduits 26 and 27 to permit free flow of water and steam to and from the bladder 13. Each of said passages may have a cross section elongated in the circumferential direction.

The press P is heated by supplying steam to the annular chambers 28 and 29 of the lower and upper platens, and, if desired, the heating may be continuous to maintain a substantially constant temperature.

Figure 2:
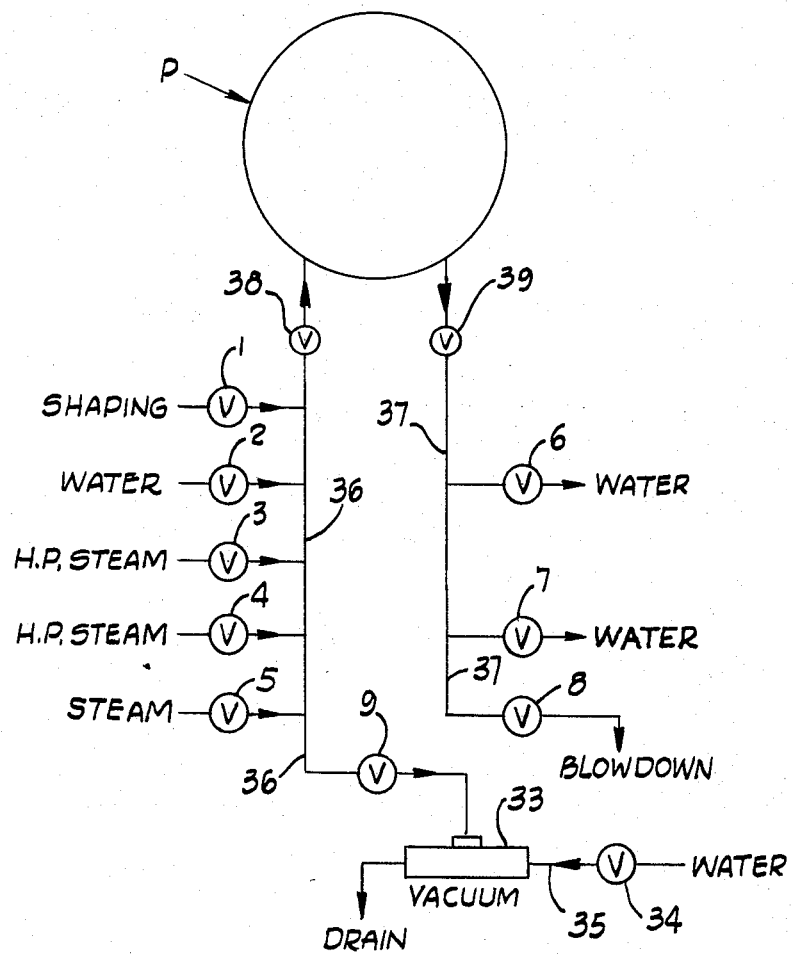
FIG. 2 is a diagrammatic plan view showing valves and piping for controlling flow of water and steam to and from the curing bladder of the press.

FIG. 2 indicates diagrammatically the type of piping arrangement which may be employed with one press in the practice of the invention. It will be understood, however, that a commercial system would involve dozens of presses with one or two tire molds in each press and would require a more sophisticated system. The apparatus of FIG. 2 includes valves 2 through 9 and other valves for controlling flow of water and steam to and from the curing bladder of the press P through inlet and outlet conduits 36 and 37. Valves 38 and 39 in the latter conduits are normally open and can be closed to stop such flow when the press P is out of service.

The valve 1 controls the flow of shaping steam; valve 2 controls the flow of high-pressure heated water; and valves 3, 4 and 5 control the flow of steam. Valves 6 to 8 control flow from the outlet conduit 37, and valve 9 controls flow from the inlet conduit 36 to the vacuum pump 33. The latter is a venturi-type pump receiving water through cut-off valve 34 and conduit 35.

In the practice of the invention, the inlet conduit at 2 may be supplied with heated water at a high pressure, such as 300 to 400 psig, and the inlet conduits at 3 and 4 may be provided with saturated steam at pressures of 240 to 300 psig. Additional inlet conduits, such as the conduit at valve 5, may be supplied with steam at lower pressures, such as 100 or 150 psig.

For example, when carrying out the process of the invention, all of the valves 1 through 7 and 9 are initially closed at the beginning of a cycle. After the green tire is positioned on the lower mold half 15, the valve 8 is closed and the valve 1 is opened to admit shaping steam to the bladder 13 at a pressure of 10 to 20 psig until the tire approaches its full size. The press then closes and locks in the closed position of FIG. 1. The valve 3 is then opened to admit the steam (i.e., at 250 psig) to the inlet conduit 36 while outlet 37 is obstructed or cut off. This is the first steam heating stage. If desired valve 4 may be opened instead to provide steam at 300 psig. At the end of stage I, the valves 3 and 4 are closed and valve 2 is opened to admit the heated high-pressure water in stage II while the outlet 37 is cut off (dead ended). This fills the bladder with water while maintaining the high internal pressure.

At the end of stage II, the valve 3 is opened to admit high pressure steam and valve 7 is opened simultaneously so that the water is expelled from the bladder in a short blowback period of 1 or 2 min depending on the tire size. Vavle 7 is then closed to dead end the steam for the remainder of stage III. One-way check valves (not shown) may be employed in the inlet lines at 1, 2, 3 and 4 to prevent unwanted reverse flow. Before the end of stage III, valves 3 and 4 are closed and optional valve 5 may be opened to admit steam to the bladder at a reduced pressure such as 100 or 150 psig. This cools the inner surface of the hot bladder and permits the residual water in the bladder to boil off. Blowdown is initiated by closing valve 5 and opening valve 8 to release the pressure in the bladder and to vent the bladder to the atmosphere. After a natural blowdown period the valve 8 is closed and valves 9 and 34 are opened to apply a vacuum to conduit 36 and to effect rapid loss of pressure in the bladder so that the mold can be opened. After blowdown is completed, the valve 8 is opened.

The dead end water system described above does not require 150 HP pump motors as in typical circulating hot water systems and can operate effectively with smaller economical pump motors. Water pressures of 300 to 400 psig or higher can easily be provided to more than a dozen presses using pump motors of moderate size, such as 20 or 25 HP. Dead ending of the high-pressure heated water reduces the power requirements and facilitates immediate detection of leaks, so that it is practical to operate with internal water pressures of 350 to 450 psig. The invention also makes it economical to modify existing equipment in plants which employ high-pressure circulating water systems.

As pointed out in Naunton, supra, a pneumatic rubber tire presents a difficult problem during vulcanization. The same degree of cure cannot be provided at the thin sidewalls as is provided at the center of the bead area or the top portion of the carcass at the shoulders. The critical area is the region of least cure which is usually located at the shoulder of the tread near the side of the circumferential belts located between the carcass and the tread (i.e., point a in FIG. 1). As pointed out by Naunton, the product will "blow" or become porous if the pressure is released before the rubber has adequate cure to develop the necessary tensile strength and hardness. The relation between the "blow point" or "porous point" and the point of optimum cure for a piece of rubber is indicated by Naunton in FIG. 12.23 on page 1056.

If the pressure on the tire being cured is released too soon before the region of least cure has passed the blow point, the rubber will become porous in that region and the tire must be rejected as defective. Tire manufacturers normally aim for a mold cure period somewhat longer than that required for the point of least cure to pass the blow point in order to provide a factor of safety. Computers can be used to estimate the degree of cure so that the mold can be opened sooner (see W. F. Mattson U.S. Pat. No. 4,371,483).

The problems associated with the vulcanization of truck and passenger car tires have increased since the development of modern bias/belt and radial ply tires having multi-layer circumferential belts (i.e., steel belts, glass fiber belts, etc.) located between the tread and the carcass. These modern tires require the application of high pressures from 300 to 400 psig during vulcanization to assure thorough diffusion of entrapped air, particularly large tires with 6 or more carcass plies and premium tires with folded circumferential reinforcing belts. The folds of the latter are troublesome because they are at or near the points of least cure in the tread shoulders.

The quality standards in the tire industry are stringent and are continually increasing because of product liability litigation, consumer protection movements, and the demands of informed purchasers. Tire manufacturers insist upon manufacturing procedures which can produce "anomaly-free tires" or tires free of defects detectable by modern holographic testing equipment, particularly defects due to inadequate diffusion of entrapped air. Procedures which result in a substantial percentage of tires with holographic irregularities due to inadequate air diffusion are unacceptable.

It is for this reason that tire manufacturers have continued to use the energy-inefficient circulating hot water systems to supply the curing bladders of the "Bag-O-Matic" and "Autoform" presses (see U.S. Pat. No. 3,579,626) and why internal pressures of 300 to 400 psig have been maintained until the end of the mold curing period to assure the production of anomaly-free tires of the highest quality.

The circulating water systems used by tire manufacturers do not produce anomaly-free tires in an economical manner, and the systems have serious disadvantages. They do not permit rapid change in bladder temperature, and the normal practice is to provide a substantially constant water temperature in the bladder during curing. The heat transfer to the bladder is slow when using heated water because of the extremely low film coefficient as compared to steam, and the bladder cannot respond quickly to changes in water temperature.

The present invention permits the use of steam for one-half to two-thirds of the mold curing cycle and makes it possible to adjust the rate of heat transfer during the cure as desired and in such a way as to shorten the cycle while maintaining or improving tire quality. The film coefficient for steam at the steam-bladder interface is probably 50 to 100 times that of water and such that the inner liner or bladder can be heated rapidly at any time during the cure cycle. The present invention permits use of steam at high pressures, such as 250 to 300 psig, to effect diffusion of the entrapped air so that the high-pressure water is needed for only a minor portion of the cycle. Thus, when curing a heavy duty truck tire for 60 to 90 min or more, an internal water pressure of 350 to 400 psig may be required for only 20 to 25 min. The time period is short enough so that temperature stratification is not excessive when the water is "dead ended" by obstructing and cutting off outward flow from the bladder. The process of this invention may employ circulating water using existing equipment in the factory and will greatly improve the energy efficiency of the circulating water system, but maximum savings are effected using dead end water or interrupting outward flow of water from the bladder.

In manufacturing tires according to this invention standard rubber compositions can be used and common procedures can be employed to process the rubber, tire cord and other portions of the tire and to build the green tire as described, for example, on pages 569 to 607 of "*Science and Technology of Rubber*" by F. R. Eirich (1978).

In accordance with the present invention, the green tire is placed in the tire mold and expanded by shaping steam in the conventional manner at a low pressure, such as 10 to 25 psig. The tire is then expanded in the closed mold by the curing bladder using saturated steam at a high pressure, such as 240 to 300 psig. The mold is preferably heated externally during most or all of the pressure-curing period.

High-pressure steam is provided in the bladder for about 10 to 40 percent of the pressure-curing period in stage I, dead end water is maintained in the bladder at a pressure of 280 to 450 psig for about 20 to 60 percent and preferably no more than half of said curing period in stage II, and the water is expelled and replaced by steam at a temperature preferably no less than that of the water which is maintained in the bladder for about 25 to 60 percent of said curing period in stage III. A pressure of from 250 to 450 psig is applied to the bladder by the high-pressure water and steam for at least one-third of said curing period to effect thorough diffusion of entrapped air, and such high pressure is preferably maintained for at least about half of the pressure-curing period and long enough to assure that the tire is anomaly free and that there are no defects due to entrapped air which can be detected by standard holographic tire testing equipment. (see "*Elastomerics*", September 1980, pg 34)

When vulcanizing truck tires, tractor tires and other large tires requiring a pressure-curing period of 30 to 90 min or more, the high pressure steam is provided in the bladder for about 4 to 15 min in stage I, the high-pressure dead end water is maintained in the bladder for about 10 to 30 min in stage II, and the steam is provided for about 10 to 50 min or more in stage III, so that an internal pressure of from 250 to 450 psig is maintained for at least 15 min and usually at least one-third of the pressure-curing period to diffuse the entrapped air before the pressure is released to start the blowdown.

When vulcanizing passenger car tires and light truck tires using a pressure-curing period no greater than 30 min, the high-pressure steam is supplied to the bladder for about 3 to 10 min in stage I, and the dead end water is preferably maintained in the bladder for about 4 to 15 min in stage II. The pressure of the high-pressure steam provided in stage III is preferably reduced to about 100 to 190 psig during the last part of the cure to cool the hot bladder and boil off residual water. Such reduction of pressure and cooling is important and materially increases bladder life.

When vulcanizing passenger car tires and light truck tires using a pressure-curing period of about 10 to 20 min, steam at a pressure from 240 to 300 psig is provided for 3 to 8 min in stage I, dead end water at a pressure of at least 280 psig (preferably 300 to 450 psig) is provided for about 3 to 12 min in stage II, and steam at a pressure of 240 to 300 psig is provided during stage III to increase the rate of heat transfer and to effect turbulence during blowback. The blowback period is usually no more than about 1 min. Thereafter steam under pressure is provided in stage III for 3 to 10 min and preferably for at least one-quarter and no more than one-half of the pressure-curing period. The internal fluid pressure applied to the bladder by the dead end water and steam is from 240 psig to 450 psig for the major portion of said curing period, and said pressure is preferably 280 to 300 psig or higher for at least 40 percent of said curing period. The pressure may be obtained, for example, by supplying steam at a pressure of at least 280 psig for 3 to 7 min in stage I and heated water at a pressure of from 300 to 450 psig for 5 to 10 min in stage II.

In carrying out the invention, the supply of high-pressure water is cut off at the end of stage II and immediately steam at a high pressure, such as 240 to 300 psig, is admitted to the bladder to start stage III. At this time an outlet valve 7 is opened to start the blowback. The high-pressure steam rapidly forces the water out of the bladder during a short blowback period, which is typically from about 0.5 to 1.0 min for a passenger car tire and from about 1.5 to 2.5 min for a truck tire. The steam may be introduced at high velocity and in such a way as to increase turbulence during blowback whereby the amount of residual water remaining in the bottom portion of the bladder is reduced or minimized. The water removal during blowback is facilitated by introducing the steam at a pressure of 250 to 300 psig or higher. Effective water removal is important to provide a more uniform cure and to assure proper heat transfer to the lower half of the tire (see U.S. Pat. No. 3,329,748).

The blowdown after release of pressure includes (a) a natural or unassisted blowdown period wherein the residual water flashes to steam at the reduced pressure and the steam pressure falls as the steam leaves the outlet, and (b) a vacuum removal period, wherein a venturi-type vacuum pump sucks the remaining gas and steam from the bladder to reduce the bladder pressure rapidly so that the mold can be opened. The overall blowdown period ends when the mold is opened and is 1 min or so when curing a typical passenger car tire by the conventional method in a typical "Bag-O-Matic" press.

The manufacture of top quality anomaly-free tires is difficult because of the construction of modern radial ply and bias/belted tires and requires high internal pressures such as 300 to 400 psig for substantial periods of time to diffuse the entrapped air, especially in truck tires with 10 - or 12-ply ratings and premium radial tires having folded belts between the tread and carcass. The problems are serious because the point of least cure (point a in FIG. 1) is at or near the side edge of the circumferential belts and the folds of the aforesaid folded belts. As indicated, for example, in said U.S. Pat. No. 4,027,543 the amount of curing tends to be excessive at the outer portions of the tire when adequate curing is provided in the tread shoulders at the point of least cure. FIG. 1 locates the point a of least cure, point b near the crown of the tire, point c near the outer surface of the tread, and point d near the inner surface of the carcass. The exterior portions of the tread and sidewalls and the interior portions of the carcass (at point d) tend to be overcured. The interior portions of the tire are slow to heat up and slow to cool and are cured to a lesser degree. The point b is located at the top of the circumferential belt in a radial ply or bias/belted tire and the point a may be located at or very close to the side edge of such belt.

The process of this invention makes it possible to reduce the length of the pressure-curing period and to open the mold sooner, thereby reducing overcuring at point c and the outer portions of the tread and sidewalls. The process also facilitates computerized control and fine tuning of the cure (i.e., by control of steam pressure during stage III) so that the degree of curing at the point of least cure can be predicted more accurately.

The length of the cure can be carefully controlled so that the curing in the mold is terminated promptly when the point of least cure has the proper number of calculated cure equivalents, as determined, for example, by the Arrhenius equation discussed in U.S. Pat. No. 4,371,483 and *Rubber Chem and Technol*, Vol. 52, 286–93 (1979). The equivalent cure time is the time required to reach the same degree of vulcanization. At the point of least cure, most of the curing may take place in a period of several minutes near the end of the pressure-curing period.

The unique process of this invention makes it possible to increase materially the rate of heat flow to the point of least cure, thus reducing overall cure time, and to obtain a top quality anomaly-free tire with the desired physical characteristics.

The invention is applicable to the vulcanization of standard rubber tread and carcass compositions containing the usual diene rubbers, fillers, extenders, antidegradants, retarders, curing agents, etc., as are disclosed for example in the following publications: *Vanderbilt Rubber Handbook,* pages 417–424 (1958); *Rubber Journal,* pages 54–64 (April 1967); U.S. Pat. No. 3,964,083; *Chemical Technology,* page 480(1972); *Rubber Chem Technol.,* Vol. 47, 216(1974); Vol. 50, 304 (1977) and Vol. 51, 819 (1978). The rubber composition forms no part of the present invention.

In the examples described hereinafter, the tread and carcass compositions for the truck and passenger car tires may be standard rubber compounds such as disclosed in the above-identified publications or as disclosed in the copending application of W. F. Mattson, Ser. No. 519,159.

The tires may, for example, be radial ply or bias/-belted tires having a multi-layer circumferential belt under the tread. The carcass plies contain rayon, nylon, aramid or polyester tire cord. The circumferential belts may contain glass fiber, rayon, aramid, or wire reinforcement.

The present invention may be used for curing standard size tires in pot heaters (see U.S. Pat. No. 2,066,265), steam-dome presses (see U.S. Pat. No. 3,358,762 or 2,775,789) or platen presses (see U.S. Pat. No. 2,808,618 or 2,846,722). Jacketed molds with integral steam chambers may also be used. In the examples described below, the tires are shaped and cured in a Bag-O-Matic press. The press preferably has an internal curing bladder with a thickness of about $\frac{1}{4}''$ to $\frac{1}{2}''$ in the unstretched condition. The press may be substantially as described on pages 1080 to 1082 in Naunton, supra, or in U.S. Pat. Nos. 2,775,789 and 2,846,722).

Following common practices, a 10.00×20 bias/belt truck tire may, for example, be placed in a standard tire mold in a conventional steam-dome shaping and vulcanizing press and cured for 45 min or so using a constant dome steam pressure of about 50 psig to effect external heating of the mold. During this cure the curing bladder with a thickness of about 0.5" (inch) would be heated with circulating hot water at an average temperature of about 185° C. and a pressure of about 400 psig. In this example, the green truck tire is expanded by shaping steam at a pressure of 10 to 20 psig to almost the size of the mold cavity, and steam at a pressure of 200 psig is then supplied to the curing bladder for 5 min. Then the circulating water at 185° C. and 400 psig is passed through the curing bladder for 40 min to cure the tire and provide thorough diffusion of entrapped air. At the end of the cure, the supply of circulating water is cut off and steam at a pressure of 200 psig is admitted for a period up to 1.5 min to blow the hot water out of the curing bladder while maintaining the pressure to prevent evaporation of the water. Then the pressure on the bladder is released to start natural blowdown which permits the water to boil off and the steam pressure to drop below 20 psig in about 1.5 to 2 min. The interior of the bladder is then connected to a venturi-type suction pump which reduces the internal bladder pressure to less than 2 psig in about 1 min. The mold is opened immediately and the bladder retracted from the tire. The overall time for the cycle is about 49 to 49.5 min. This conventional procedure produces a tire of very high quality free of defects due to entrapped air.

With a simple change in the procedure, a tire of the same high quality can be made in less time and at much less cost in the same tire mold and the same steam dome press using the identical green tire made from the same rubber compositions and using the same dome steam pressure of 50 psig. In the example according to the present invention, the same green tire is expanded by shaping steam at 10 to 20 psi and the curing bladder is then supplied with steam for 9 min at 250 psig (Stage I) followed by dead end water at an average temperature of about 185° C. maintained in the bladder for 21 min at 400 psig (Stage II). During this time the outlet from the bladder is cut off to prevent water circulation. Then steam at a pressure of 250 psig is admitted to blow the hot water out of the bladder for up to 1.5 min while the pressure is maintained. Thereafter outward flow is cut off, steam is continued to be supplied during stage III at 250 psig for 4 min, and the steam pressure is then allowed to drift down to 200 psig for about 3 min and thereafter allowed to drift down to 150 psig for 1 min. The steam pressure in the bladder is then held at 150 psig for 5 min to effect cooling of the internal surface of the hot bladder while completing the cure. Then the pressure on the mold is released to initiate blowdown.

The natural blowdown requires about 1.2 to 1.5 min, and vacuum is applied for about 0.5 to 0.6 min to eliminate pressure in the bladder so that the mold can be opened. The blowdown procedure and application of vacuum are as before, but surprisingly only half as much time is required. With an overall cycle time of 46 to 47 min, the process can produce an anomaly-free tire with a quality as high as that of the tire produced by the conventional method.

Comparable results can be obtained using 300 psi steam to improve air diffusion. Thus substantially the same procedure described above can be employed using an internal steam pressure of 300 psig in stage I for 6 to 7 min.

In this example and the previous examples, satisfactory tires can be produced using steam at a lower pressure, such as 200 psig, for most or all of stage III. It is preferable to lower the steam pressure for at least several minutes during the pressure-curing period to cool the interior surface of the hot bladder before blowdown and to boil off residual water.

The process of the present invention is particularly advantageous in connection with the manufacture of passenger car tires where the typical pressure-curing period is from 12 to 20 min. For example, in the manufacture of a standard tubeless radial-ply tire in a conventional steam-heated platen press using heated water at a pressure of 300 psig, the curing period according to the prior art may be around 20 minutes with the platen maintained at a temperature of about 170° C. In this example, the green radial tire is expanded by shaping steam at 10 to 20 psig, and steam at 250 psig is supplied to the bladder for 3 min followed by dead end or circulating water at 300 psig and about 195° C. for 15 min. The water is then blown out of the bladder by steam maintained at 250 psig in a blowback period of up to 1 min to complete the cure, and then blowdown is initiated by releasing the pressure in the mold. The natural blowdown takes about one-half minute and vacuum is applied from a venturi-type suction pump for another half min so that the overall cycle time is about 20 min. The process produces an anomaly-free tire of top quality.

A simple change in the procedure according to this invention makes it possible to produce passenger car tires of the same high quality in a shorter cycle using the identical green tire made from the same rubber compositions. The same platen press is employed with the same platen temperature (170° C.), and the same tire mold is used. After the bladder is expanded by the shaping steam, steam at 250 psig is supplied for 4 min in the first stage and dead end water at 300 psig and about 195° C. is provided for 9 min in the second stage. The valve controlling the water inlet is closed and the valve controlling the steam supply is opened to admit steam maintained at a pressure of 250 psig. The steam blows the water out of the bladder in a blowback period of less than 1.0 min. After blowback the steam pressure in the bladder is maintained at 250 psig for 2 min and then allowed to drift down to 150 psig in about 1.5 min to cool the inner surface of the hot bladder and to allow boiling of the residual water. The pressure is held at 150 psig for one more minute and the pressure is then released to start natural blowdown. After 0.3 min of blowdown a vacuum is applied by a venturi-type vacuum pump for 0.2 min to reduce the pressure in the bladder below 1 psig, and the mold is opened. The overall time is about 19 min and at least 1 min less than the previous example. The properties of the tire are essentially the same as those of a tire made by the conventional procedure wherein the water pressure is maintained for 15 min. The multistage process of this invention produces the same premium quality anomaly-free tire.

A similar multistage process used with a smaller passenger car tire will provide a comparable reduction in cure time while maintaining the same quality standards. For example, using the same rubber compositions as before, the same external heating and the same press, steam at 250 psig is provided for 4 min in stage I, dead end water at 300 psig and about 195° C. is provided for 7 min in stage II, and steam at 250 psig is provided for 3 min in stage III with an additional 2 min cure as the steam pressure drifts from 250 psig to 150 psig before blowdown.

Good results are also obtained in a multistage process wherein steam at 300 psig is provided for 4 min in stage I, dead end water at 350 psig is provided for 4 to 5 min at 190° to 195° C. in stage II, and steam at 250 psig is provided for 2 min during the first part of stage III followed by a pressure reduction or drift down to 180 psig for 1 to 2 min to cool the internal surface of the bladder and boil off residual water.

In carrying out the invention in accordance with each of the above examples, the bladder may have a thickness from 0.2 to 0.5", and it will be understood that greater thickness can be used, especially for large tires with longer cures. With shorter cures a thin bladder is advantageous, and a thickness of from about 0.1 to 0.3" may be preferred.

We claim:

1. In a process for vulcanizing a rubber tire in a closed mold having a generally toroidal mold cavity and an extensible curing bladder wherein a green tire is expanded in the mold by supplying a pressure fluid to the bladder and exterior portions of the tire are heated by supplying heat to the closed mold during a pressure-curing period sufficient to vulcanize the tire, a multistage process comprising, (a) in a first stage with flow from the bladder cutoff, supplying high-pressure steam to the bladder at a pressure of at least 250 psig to heat said bladder and to shape the tire, said steam being provided in the bladder for about 10 to 40 percent of said pressure-curing period;

(b) in a second stage while flow from the bladder remains cutoff, supplying water to the bladder at a pressure of at least 280 psig and maintaining the water for about 20 to 60 percent of said pressure-curing period;

(c) in a third stsge, expelling water from the bladder with high-pressure steam and continuing to provide steam in the bladder for about 25 to 60 percent of said pressure-curing period so that the fluid pressure applied to the bladder during said pressure-curing period is from 250 psig to 450 psig for at least one-third of said pressure-curing period to effect thorough diffusion of air; and (d) releasing pressure and removing water and steam from the bladder to permit opening the mold.

2. A multistage tire vulcanizing process according to claim 1 wherein said pressure-curing period is no more than 30 min, high-pressure steam is supplied to said bladder for about 3 to 10 min in the first stage, heated water is supplied to the bladder and maintained in the bladder for about 4 to 15 min in the second stage, and the steam pressure provided in the third stage is from 100 to 190 psig during the last portion of said pressure-curing period to cool the bladder and to boil off residual water.

3. A multistage tire vulcanizing process according to claim 1 wherein said pressure-curing period is at least 30 min, high-pressure steam is supplied to the bladder for at least 4 min during the first stage, heated water is supplied to the bladder at a pressure of at least 280 psig during the second stage and maintained in the bladder for at least 10 min, and high-pressure steam is supplied to the bladder for at least 10 min during the third stage, so that an internal bladder pressure of at least 250 psig is provided for at least 15 min.

4. In a process for vulcanizing a rubber tire in a closed mold having a generally toroidal mold cavity and an extensible curing bladder wherein a green tire is expanded in the mold by supplying a pressure fluid to the bladder and exterior portions of the tire are heated by supplying heat to the closed mold during a pressure-curing period of at least 30 min, a multistage process comprising, (a) in a first stage with flow from the bladder cutoff, supplying high-pressure steam to the bladder for at least 4 min to heat said bladder and to shape the tire;

(b) in a second stage while flow from the bladder remains cutoff, supplying water to the bladder at a pressure of at least 280 psig and maintaining the water pressure for at least about 10 min;

(c) in a third stage, expelling water from the bladder with steam and continuing to provide high-pressure steam in the bladder for at least about 10 min so that the fluid pressure applied to the bladder by the steam and the water during said pressure-curing period is from 250 psig to 450 psig for at least 15 min to diffuse entrapped air; and (d) releasing pressure and removing water and steam from the bladder to permit opening the mold.

5. A multistage tire vulcanizing process according to claim 4 wherein a steam pressure from about 100 to 190 psig is provided for at least 3 min during the third stage to cool the inner surface of the bladder and to boil off residual water before the pressure is released to initiate blowdown.

6. In a process for vulcanizing a rubber tire in a closed mold having a generally toroidal mold cavity and an extensible curing bladder wherein a green tire is expanded in the mold by supplying a pressure fluid to the bladder and exterior portions of the tire are heated by supplying heat to the closed mold during a pressure-curing period up to 20 minutes sufficient to vulcanize the tire, a multistage process comprising, (a) in a first stage with flow from the bladder cutoff, supplying high-pressure steam to the bladder at a pressure of at least 240 psig for about 3 to 8 min;

(b) in a second stage while flow from the bladder remains cutoff, supplying water to the bladder at a pressure of from 280 psig to 450 psig and maintaining the water in the bladder for 3 to 12 min;

(c) in a third stage, expelling water from the bladder with high-pressure steam at a pressure of at least 240 psig, and continuing to provide steam in the bladder for 3 to 10 min so that the fluid pressure applied to the bladder is from 240 psig to 450 psig for the major portion of said pressure-curing period; and (d) releasing pressure and removing water and steam from the bladder to permit opening the mold.

7. A tire vulcanizing process according to claim 6 wherein the pressure is reduced to within the range from 100 to 190 psig near the end of said pressure-curing period to cool the bladder and boil off residual water, the remaining water and steam are rapidly removed from the bladder, and the mold is opened about 0.4 to 0.6 min after the pressure is released to initiate blowdown.

8. A process according to claim 6 wherein steam is supplied to the bladder at a pressure of from about 250 to 350 psig for at least 3 min in the first stage, heated water is supplied to the bladder at a pressure of from about 300 to 450 psig for at least 3 min in the second stage, and steam is supplied to the bladder at a pressure of from about 250 to 300 psig for at least 3 min in the third stage.

9. A process according to claim 6 wherein steam at a pressure of at least 280 psig is supplied to the curing bladder for at least 3 min in the first stage, and the water supplied to the bladder is maintained at a pressure of from 300 psig to 450 psig for at least 5 min in the second stage.

* * * * *